United States Patent
Dobler

(10) Patent No.: US 7,366,667 B2
(45) Date of Patent: Apr. 29, 2008

(54) METHOD AND DEVICE FOR PAUSE LIMIT VALUES IN SPEECH RECOGNITION

(75) Inventor: Stefan Dobler, Neunkirchen Am Brand (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 604 days.

(21) Appl. No.: 10/496,769

(22) PCT Filed: Dec. 21, 2001

(86) PCT No.: PCT/EP01/15274

§ 371 (c)(1),
(2), (4) Date: Jul. 22, 2004

(87) PCT Pub. No.: WO03/054856

PCT Pub. Date: Jul. 3, 2003

(65) Prior Publication Data

US 2005/0038652 A1    Feb. 17, 2005

(51) Int. Cl.
*G10L 15/04* (2006.01)
*G10L 15/12* (2006.01)
*G10L 11/02* (2006.01)

(52) U.S. Cl. .................. 704/241; 704/215; 704/253
(58) Field of Classification Search ............... 704/243, 704/244, 248, 253, 255, 210, 215, 241
See application file for complete search history.

(56) References Cited

U.S. PATENT DOCUMENTS 4,336,421 A * 6/1982 Welch et al. ............... 704/243
5,687,288 A * 11/1997 Dobler et al. .............. 704/255
5,870,709 A    2/1999 Bernstein
5,970,452 A * 10/1999 Aktas et al. ................ 704/253
6,076,056 A *  6/2000 Huang et al. ............... 704/254
6,285,980 B1 * 9/2001 Gandhi et al. ............. 704/256

(Continued)

FOREIGN PATENT DOCUMENTS

EP    0389514 B1    10/1990

(Continued)

OTHER PUBLICATIONS

Noll et al. "Real-time connected word recognition in a noisy environment", Conference on Acoustics, Speech, and Signal Processing, 1989. ICASSP-89, May 23-26, 1989, vol. 1, pp. 679 to 681.*

Dobler et al., "A robust connected-words recognizer", International Conference on Acoustics, Speech and Signal Processing, 1992. ICASSP-92, vol. 1, pp. 245 to 248.*

*Primary Examiner*—Martin Lerner
(74) *Attorney, Agent, or Firm*—Michael Cameron

(57) ABSTRACT

Method and device for the recognition of words and pauses in a voice signal. The words ($W_i$) spoken in a row and pauses ($T_i$) are thereby combined as to be appertaining to a word group as soon as one of the pauses ($T_i$) exceeds a limit value (TG). Stored references ($R_j$) are allocated to the voice signal of the word group, and an indication of the result of the allocation is effected after the limit value (TG) has been exceeded. To this end, parameters corresponding to the moments of the transitions between ranges with voice and non-voice are determined from the voice signal, and the limit value (TG) is then changed in dependence on said parameters.

12 Claims, 2 Drawing Sheets

U.S. PATENT DOCUMENTS

Figure 1:
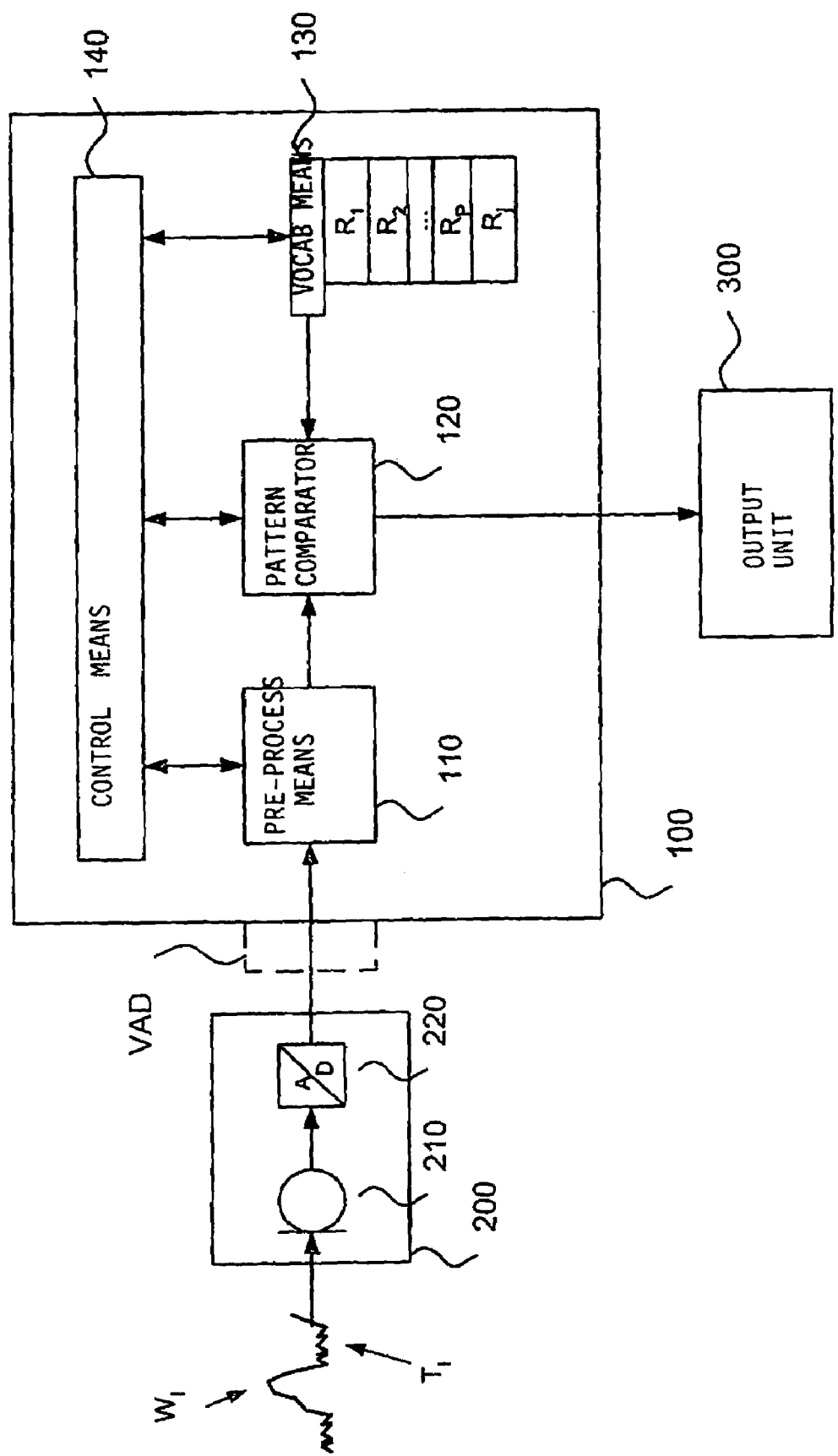

2002/0042709 A1    4/2002    Klisch et al.

FOREIGN PATENT DOCUMENTS

EP          1081683 A1    3/2001
WO       WO 89/04035      5/1989

OTHER PUBLICATIONS

Ney, H., "The Use of a One-Stage Dynamic Programming Algorithm for Connected Word Recognition", IEEE Transactions On Acoustics, Speech, and Signal Processing, vol. 32, No. 2, Apr. 1984. (pp. 263-271).

* cited by examiner

METHOD AND DEVICE FOR PAUSE LIMIT VALUES IN SPEECH RECOGNITION

The invention relates to a method and a device for speech recognition.

Speech recognition methods are known in general. Thus, there are not only methods for the recognition of individual words, but also methods for the recognition of word groups. A word group consists of a number of consecutive individual words. The individual words are reproduced in voice ranges in a voice signal. Said ranges are separated by pauses, i.e. time intervals without voice, which are also called non-voice ranges. Such pauses may be time intervals of a very short, hardly audible duration, or also longer time intervals. In both, individual word recognition and word group recognition, a reference is allocated to each of the words being, e.g. numerals, letters or also so-called keywords, namely by comparing each of said words with said previously stored references. For controlling the recognition, an acoustical or visual indication in correspondence with the allocation may then take place.

Such speech recognition methods are increasingly used especially in portable terminals, such as in mobile phones. First speech recognition methods in mobile phones were based on the recognition of individual words, wherein a user speaks a word like, for example, <Stefan> or <dial>. In a pattern comparator said spoken word is then associated with a stored reference, and an acoustical or visual indication is effected in accordance with said association for control purposes. If the speech recognition is successful, i.e. if the user confirms the reproduced reference as the one corresponding to the spoken word, the calling number allocated to the word or rather to the reference <Stefan> is then activated by the mobile phone, or the function allocated to the word <dial> is executed. Such a speech recognition method is used if, for example, a user wishes to use a mobile phone in handsfree operation in the car. In more recent mobile phone generations speech recognition systems for the recognition of word groups are used more and more. It is the objective that a user can operate or control a device, e.g. a mobile phone, entirely by means of speech commands and without any limitations.

EP 0 389 514, for example, discloses a method for the recognition of word groups. Based on a numerical order such as <one-two-three-four-five-six-seven> a mobile phone user forms the word groups <one-two-three> and <four> and <five-six> and <seven> with a variable number of words by making pauses with a previously defined pause length between the word groups < . . . >. In each pause which length exceeds said defined pause length, a pause signal is generated. As a result of said pause signal, the references allocated to the spoken words are then acoustically or visually indicated to the user. Due to the fact that the user makes pauses of a certain length between the word groups, he is free to group the numerals of a telephone number and to have the result of the recognition indicated in accordance with his individual flow of words. In dependence on his environment, e.g. the ambient noise in a car, he will then form word groups with a few words only. If the recognition is incorrect, he has the possibility of correcting at least the word group spoken last.

Regardless of the ambience, the individual flow of words of a rather inexperienced user will be different from that of an experienced user. Thus, it is conceivable that the inexperienced user groups, for instance, a phone number into word groups with two numerals each with rather longer pauses between the word groups. The experienced user will, in contrast thereto, enter the individual numerals of the phone number faster into the mobile phone, with many numerals in a few word groups only and with shorter pauses therebetween. If such an experienced user now uses, for example, a mobile phone on the basis of the method known from EP 0 389 514, and if the previously defined pause length for releasing the pause signal has been specified to be relatively long, he may have to wait for too long a time until the indication or the reproduction of the recognized words takes place. If, on the other hand, the previously defined pause length is too short, the inexperienced user, who makes relatively long pauses-between the word groups, will possibly release a pause signal and thus a reproduction although this had not been his intention at that time. In other words, both—the inexperienced and the experienced user—have to adjust to the marginal conditions of speech recognition as far as their flow of words is concerned, such as to the previously defined length of the pause. Therefore, both user groups are restricted in view of their individual flow of words.

Therefore, the present invention is based on the object to provide a method and a device, which allow the adjustment of the reproduction time of the recognized words to the individual flow of words of the respective user.

The invention is accordingly based on the idea that in a method or a device for the recognition of words and pauses from a voice signal the limit value, at which a pause exceeds a certain length, is changed in dependence on parameters determined from the voice signal. In other words, the limit value is increased or reduced in dependence on said parameters and, thus, to the flow of words of the user, and that the time of the reproduction of the result by the pattern comparator takes place either after a longer or rather a shorter pause length.

The advantage of the invention resides in that a user of the method or the device according to the invention is not inhibited in his individual flow of words by the reproduction or the indication of the recognition result. The reproduction is rather adjusted to the behavior of the user, i.e. to his flow of words. Thus, a user is less or not at all disturbed in his individual flow of words, as the result of the speech recognition is reproduced or indicated at a time determined by the user's flow of words.

The method according to the invention is preferably executed in a number of consecutive word groups for each of the word groups. In the normal case, the user will speak, e.g. a phone number, in several word groups one after the other, so that it is advantageous to adjust the limit value and thus the time of the reproduction for the subsequent word groups to the perception of the flow of words of the user, at least from the word group spoken last. By means of this dynamic adjustment of the indication to the respective user, for instance, the acoustical reproduction will take place during the pause after the word group spoken last, i.e. also before the user speaks the next word group. Thus, the experienced user, who makes shorter pauses, will not have to wait a long time for the reproduction, whereas the inexperienced user, who makes longer pauses also within a word group, will not get an undesired reproduction. This could, for instance, occur, if the duration of said longer pauses within the word group exceed the limit value.

The device according to the invention may be used in portable terminals such as mobile phones. Here, the user has the possibility that the mobile phone adopts his flow of words. In dependence on his ambience he can thereby sub-divide, for example, a phone number into word groups in the way he would normally also speak said phone number.

The application of the device according to the invention in a central speech recognition device for the selection of speech in a telecommunication network allows the user to optimize the connection fees incurred by him. Also, the time of the reproduction of the recognition result can be adjusted to the flow of words of a user. The experienced user, who speaks fast, for example, will receive an acoustical reproduction of the recognition result within a shorter time period, namely due to the adjustment of the indication of the recognition result to his flow of words. The entire speech selection method can thereby be carried out faster, so that the costs for the telephone connection are reduced for the user.

Additional advantageous embodiments and preferred developments of the method and the device according to the invention are described in the sub-claims.

Figure 2:
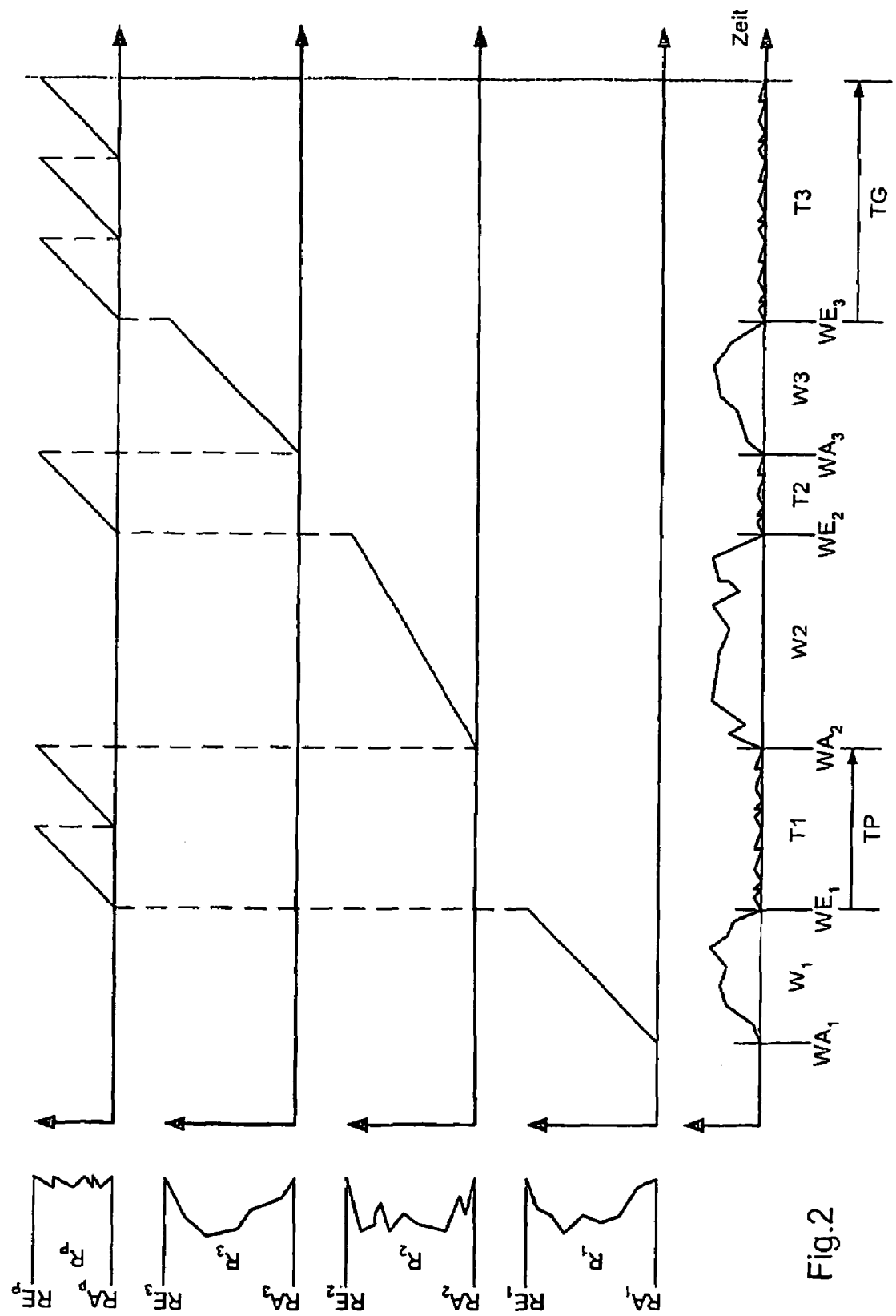

The invention shall now by explained in more detail by means of the figures, wherein FIG. 1 shows a block diagram of a speech recognition device in a mobile phone;

FIG. 2 shows a search field of a pattern comparator.

FIG. 1 shows essential components of a speech recognition device in a mobile phone. The device 100 for the recognition of words and pauses is connected to an input unit 200 comprising a microphone 210 for inputting a voice signal and an analog/digital converter 220. The device 100 includes a pattern comparator 120 as central unit, which operates according to a known speech recognition method. The pattern recognizer 120 is connected to a vocabulary memory 130 in which a finite number N of pre-trained references $R_j=\{R_1, R_2, \ldots, R_p, \ldots, RN\}$ is stored. The device 100 moreover comprises pre-processing means 110 converting the voice signal coming from the input unit 200 into a parametric description. A control means 140 is connected to the pattern comparator 120, the vocabulary memory 130 and the pre-processing means 110. The device 100 is additionally connected to an output unit 300 to display the result from the pattern comparator 120 to the user of the mobile phone either acoustically or visually. The pre-processing means 110, the pattern recognizer 120, the vocabulary memory 130 and the control means 140 illustrated in FIG. 1, which correspond to essential functions inside the device 100 and, as a rule, are provided in the form of algorithms, may be combined in an optional manner. Thus, it is conceivable, for example, that 110, 120, 130 and 140 are combined in a single processor, or that only 120, 130, 140 are combined in a processor.

A first embodiment of the method for speech recognition according to the invention, i.e. the recognition of words and pauses, shall hereinafter be explained in more detail. To this end, a search field of a pattern comparator 120 is illustrated in FIG. 2. The references $R_j$ depicted on the vertical axis, which will hereinafter be referred to as word references $R_1$, $R_2$, $R_3$ and pause references $R_p$, are usually pre-trained speech models then stored in the memory unit 120. Thus, for example, the word reference $R_1$ can correspond to the pre-trained numeral or rather to the word <one>, the word reference $R_2$ to the word <two> and the word reference $R_3$ to the word <fifty two>. The pause reference $R_p$ constitutes a pre-trained model for non-voice, such as a pause of a certain length and under normal environmental conditions. The word references $R_1$, $R_2$, $R_3$ may be speaker-dependent or speaker-independent and are generated in accordance with generally known methods. The stored word references $R_1$, $R_2$, $R_3$ with the word beginning $RA_1$, $RA_2$, $RA_3$ and the word end $RE_1$, $RE_2$, $RE_3$ thereby reproduce, in the case of a speaker-independent recognition, approximately the speech behavior of an average speaker. This is substantially determined by the speech rate or the articulation. Parameters are detected from the voice signal inputted via the input unit 200. To this end, pre-processing means 110 are provided converting the voice signal digitalized by the A/D converter 220 into so-called feature vectors. By continuously comparing said feature vectors with the stored word references $R_1$, $R_2$, $R_3$ and the pause reference $R_p$ in the pattern comparator 120 a time-related segmentation of the voice signal into voice ranges and non-voice ranges is obtained, which are characterized by the parameters. This means that the parameters define, for example, the transitions between voice ranges and non-voice ranges. These voice and non-voice ranges of the voice signal shown on the horizontal axis in FIG. 2 can, for instance, be distinguished by the energy, the amplitude or the spectral properties of the voice signal in said ranges. Thus, the voice ranges, i.e., for example, the words, numerals, letters or key words, which, for the purpose of simplification, shall hereinafter always be referred to as $W_i=\{W_1, W_2, \ldots\}$, correspondingly have a greater energy than non-voice ranges, i.e. the ranges of pause $T_i=\{T_1, T_2, \ldots\}$. This assumption will apply always when the method is used in environments, such as office rooms. The distinction between the different ranges of the voice signal by means of the spectral properties thereof will, in contrast, then be preferred when the method is used, for example, in the car. As a rule, also in case of non-voice, the energy is here so high due to the background noise, that no distinction into voice and non-voice ranges can be made by means of the energy of the voice signal.

This results in that the moment of the transition between a non-voice range and a voice range characterizes the word beginning $WA_i$, while the transition between voice to non-voice characterizes the word end $WE_i$ of the word $W_i$. By means of the pattern comparison, and with the aid of a time adjustment, references $R_j$ are then allocated to the words $W_i$ according to a known method as is known, for instance, from Ney, H.: "The use of one stage dynamic programming algorithm for connected word recognition", IEEE Transactions, Vol. ASSP-32, no2, page 263-271, 1984. Thus, for example, the stored word reference $R_1$ <one> is allocated to a voice range corresponding to the spoken word $W_1$ <one>, and the reference <fifty two> is allocated to a further voice range corresponding to the spoken word <fifty two>. Due to the fact that the stored word references $R_1$, $R_2$, $R_3$ represent the voice behavior of an average user, the user can be characterized as an experienced or inexperienced speaker by comparing the time interval ($WE_1$-$WA_1$) of a spoken word $W_1$ with the time interval ($RE_1$-$RA_1$) of the allocated word reference $R_1$. Since all parameters of both the spoken words $W_i$ and the stored references $R_j$ are processed in the pattern comparator 120 also according to already known recognition methods, and since also the time intervals for the required time adjustment are determined in the pattern comparator 120, the method according to the invention is particularly easy to implement in already known devices. By this, an adjustment of the moment of the reproduction to the flow of words of the user is achieved in a particularly simple manner and without a substantial amount of work. The result from the pattern comparator 120 is supplied to the control means 140, which then changes, in dependence on the above-described relationship between the time interval of the spoken word and the time interval of the allocated stored reference, the limit value TG and, thus, the moment of the reproduction. In other words, the limit value TG is increased, if at least for one word $W_1$, $W_2$, $W_3$ from the word group the time interval between the word beginning and the word end thereof is longer than the time interval between the word beginning and the word end of the reference $R_j$ allocated to the word. In correspondence therewith the limit value is reduced, if at least for one word $W_1$, $W_2$, $W_3$ from the word group the time interval between the word beginning and the word end is shorter than the time interval between the word beginning and the word end of the allocated reference $R_j$.

In the following, a second embodiment of the method according to the invention will be described in more detail. So far, words $W_i$ have been allocated to the voice ranges from the voice signal. In correspondence therewith the non-voice ranges can be determined from the pauses Ti between the words $W_i$. In such pauses $T_1$, $T_2$, $T_3$ the energy of the voice signal will be very low under normal conditions as are prevailing, for example, in office rooms. Said energy will substantially be governed by background noise. As was described already, one obtains by this a time-related segmentation of the voice signal into voice ranges and non-voice ranges. With the aid of the so detected parameters of the voice signal—in this case the word beginnings $WA_i$ and the word ends $WE_i$—corresponding references $R_j$ are then allocated to the words Wi, as was described already, and by this, for example, also a time interval $T_2$ of non-voice is detected from the voice signal, which is defined by the word end $WE_2$ of the last word $W_2$ and word beginning $WA_3$ of the next word $W_3$. The limit value TG is then increased, if at least for one pause $T_i$ from the word group the time interval between the word end of a word and the word beginning of the subsequent word is longer than a pause time interval TP. In correspondence therewith the limit value TG is reduced, if at least for one pause $T_i$ from the word group the time interval between the word end of a word and the word beginning of the subsequent word is shorter than a pause time interval TP. It should be noted that the last pause—pause $T_3$ in FIG. 2—is not used for the method according to the invention, since, as a rule, TG can always be greater than or at most be equal to TP. Thus, a pause longer than TP would always be detected within a word group, and the limit value TG would correspondingly be more and more increased. As the non-voice ranges can be characterized either by the small amount of energy or by specific spectral properties of the voice signal, as was already mentioned above, it is possible to generate, for example, specific pause references $R_p$ with a word beginning $RA_p$ and a word end $RE_p$ in advance, which correspond to a pause having a length and being subject to normal environmental noises. Just like the word references this pause reference $R_p$ may also be stored in the memory unit 130. Furthermore, so-called pause fillers—not illustrated—such as <ähhh> or <mmmmh> are known, which may likewise be stored as references $R_j$ in the vocabulary memory 130. These may then also be used to detect non-voice ranges.

To this end, such stored pause references $R_p$ or pause filler references are allocated to the non-voice ranges $T_1$, $T_2$, $T_3$ of the voice signal in the pattern comparator 120 during the recognition. The length or, respectively, the duration of the individual pauses $T_1$, $T_2$, $T_3$ is then detected by determining the number of allocations to the above-described references for pause $R_p$ or the pause filler over the duration of pause $T_i$. The time interval of each of the pauses $T_1$, $T_2$, $T_3$ can then very easily be determined by the respective number of allocated pause references $R_p$ and/or pause filler references. The herein described embodiment according to the inventive method is particularly easy to implement in existing speech recognition devices, as the basic method of allocating pause references $R_p$ to pause intervals is being used in already known voice recognizers so as to detect the moment as to when a pause exceeds the limit value TG. The described method according to the invention very easily allows the characterization of the user as an experienced or inexperienced speaker, so that then an adjustment of the limit value TG is possible and an adjustment to the flow of words of the user takes place.

According to another alternative embodiment of the invention a detector VAD—shown as a dashed line in FIG. 1—is provided in the connection between the A/D converter 220 and the pre-processing means 110, to detect the parameters of the voice signal, such as the transitions between the voice ranges and non-voice ranges. The detector VAD is connected to the control means 140. By continuously determining the signal energy of the voice signal the detector VAD detects the parameters, i.e. the moments of the transitions between voice and non-voice, directly out of the voice signal. The detector VAD is realized in the form of already known algorithms and may form a unit with device 100. By means of the detector VAD and the control means 140 a pre-segmentation of the voice signal into voice and non-voice ranges is obtained. Said pre-segmented non-voice ranges are then, for example in the control means 140, compared with a predefined pause time interval TP and, in correspondence with the relationship between the pause time interval TP and the duration of the pause, the limit value TG is adjusted for reproduction according to the already described method. The adjustment of the limit value TG can thereby be realized without the subsequent pattern recognizer.

It will be appreciated by the person skilled in the art in an obvious manner that the method according to the invention is not restricted by the above-described embodiments, but embodiments are rather included according to which not only the word length of a word is compared with a reference. Rather can, for example, also a statistical averaging or a median filtering or an averaging through a sliding average value over two or more words of the word group be compared with a statistical averaging or a median filtering or a sliding average value over two or more references, and the limit value TG can then be adjusted in correspondence with this relationship. This results in an even more stable and uniform adjustment of the limit value TG and, thus, of the reproduction to the speaking habits of the user. The same reflections can be applied to the other described embodiments correspondingly. Moreover, it has not been illustrated and described—as this is easily recognizable for the person skilled in the art—that in case of a central speech recognition device with a device 100 for recognizing words and pauses for a telecommunication network, the device 1000 is preferably disposed in a central unit of the telecommunication network, and that the input unit 200 and the output unit 300 constitute the network connection between said central unit and a terminal of a user.

The invention claimed is:

1. A method for the recognition of words and pauses from a voice signal, wherein the consecutively spoken words (Wi) and pauses (Ti) are combined as to be appertaining to a word group as soon as one of the pauses (Ti) exceeds a limit value (TG), stored references (Rj) are allocated to the voice signal of the word group, and an indication of the result of the allocation is effected after the limit value (TG) has been exceeded, comprising the steps of:

determining the parameters corresponding to the moments of the transitions between ranges with voice and non-voice from the voice signal, and changing the limit value (TG) in dependence on said parameters, wherein the parameters of the references (Rj) are the word beginning (RAj) and the word end (REj) of the stored references (R).

2. The method according to claim 1, wherein the moments of the transitions are the pause beginning (TAj) and the pause end (TEj) of the pauses (Ti) of the word group.

3. The method according to claim 2, further comprising the steps of:
increasing the limit value (TG) if at least for one pause (Ti) from the word group the time interval between the pause beginning (TAj) and the pause end (TEi) is longer than a pause time interval (TP), and
reducing the limit value (TG) if at least for one pause (Ti) from the word group the time interval between the pause beginning (TAj) and the pause end (TEi) is shorter than a pause time interval (TP).

4. The method for the recognition of words and pauses according to claim 3, further comprising the step of executing the method for each of the word groups in a number of consecutive word groups.

5. A method for the recognition of words and pauses from a voice signal, wherein the consecutively spoken words (Wi) and pauses (Ti) are combined as to be appertaining to a word group as soon as one of the pauses (Ti) exceeds a limit value (TG), stored references (Rj) are allocated to the voice signal of the word group, and an indication of the result of the allocation is effected after the limit value (TG) has been exceeded, comprising the steps of:
determining the parameters corresponding to the moments of the transitions between ranges with voice and non-voice from the voice signal, and
changing the limit value (TG) in dependence on said parameters, wherein the parameters of the references (Rj) are the word beginning (RAj) and the word end (REj) of the stored references (R), and further wherein the moments of the transitions are the word beginning (WA) and the word end (WEi) of the words (Wi) of the word group.

6. The method according to claim 5 further comprising the steps of:
increasing the limit value (TG), if at least for one word (Wi) from the word group the time interval between the word beginning (WAi) and the word end (WEi) is longer than the time interval between the word beginning (RAj) and the word end (REj) of the allocated reference (Rj), and
reducing the limit value (TG), if at least for one word (Wi) from the word group the time interval between the word beginning (WAi) and the word end (WEi) is shorter than the time interval between the word beginning (RAj) and the word end (REj) of the allocated reference (Rj).

7. The method according to claim 6, wherein the moments of the transitions are the pause beginning (TAj) and the pause end (TEj) of the pauses (Ti) of the word group.

8. The method according to claim 7, further comprising the steps of:
increasing the limit value (TG) if at least for one pause (Ti) from the word group the time interval between the pause beginning (TAj) and the pause end (TEi) is longer than a pause time interval (TP), and
reducing the limit value (TG) if at least for one pause (Ti) from the word group the time interval between the pause beginning (TAj) and the pause end (TEi) is shorter than a pause time interval (TP).

9. The method for the recognition of words and pauses according to claim 7, further comprising the step of executing the method for each of the word groups in a number of consecutive word groups.

10. The method according to claim 5, wherein the moments of the transitions are the pause beginning (TAj) and the pause end (TEj) of the pauses (Ti) of the word group.

11. The method according to claim 10, further comprising the steps of:
increasing the limit value (TG) if at east for one pause (Ti) from the word group the time interval between the pause beginning (TAj) and the pause end (TEi) is longer than a pause time interval (TP), and
reducing the limit value (TG) if at least for one pause (Ti) from the word group the time interval between the pause beginning (TAj) and the pause end (TEi) is shorter than a pause time interval (TP).

12. The method for the recognition of words and pauses according to claim 11, further comprising the step of executing the method for each of the word groups in a number of consecutive word groups.

* * * * *

UNITED STATES PATENT AND TRADEMARK OFFICE
CERTIFICATE OF CORRECTION

| | | |
|---|---|---|
| PATENT NO. | : 7,366,667 B2 | |
| APPLICATION NO. | : 10/496769 | |
| DATED | : April 29, 2008 | |
| INVENTOR(S) | : Dobler | |

It is certified that error appears in the above-identified patent and that said Letters Patent is hereby corrected as shown below:

In Column 5, Line 12, delete "Ti" and insert -- $T_i$ --, therefor.

In Column 5, Line 22, delete "Wi," and insert -- $W_i$, --, therefor.

In Column 6, Line 56, in Claim 1, delete "(Wi)" and insert -- ($W_i$) --, therefor throughout the claims.

In Column 6, Line 57, in Claim 1, delete "(Ti)" and insert -- ($T_i$) --, therefor throughout the claims.

In Column 6, Line 59, in Claim 1, delete "(Rj)" and insert -- ($R_j$) --, therefor throughout the claims.

In Column 7, Line 1, in Claim 1, delete "(RAj)" and insert -- ($RA_j$) --, therefor throughout the claims.

In Column 7, Line 2, in Claim 1, delete "(REj)" and insert -- ($RE_j$) --, therefor throughout the claims.

In Column 7, Line 4, in Claim 2, delete "(TAj)" and insert -- ($TA_j$) --, therefor throughout the claims.

In Column 7, Line 5, in Claim 2, delete "(TEj)" and insert -- ($TE_j$) --, therefor throughout the claims.

In Column 7, Line 10, in Claim 3, delete "(TEi)" and insert -- ($TE_i$) --, therefor throughout the claims.

UNITED STATES PATENT AND TRADEMARK OFFICE
CERTIFICATE OF CORRECTION

PATENT NO. : 7,366,667 B2
APPLICATION NO. : 10/496769
DATED : April 29, 2008
INVENTOR(S) : Dobler It is certified that error appears in the above-identified patent and that said Letters Patent is hereby corrected as shown below:

In Column 7, Line 36, in Claim 5, delete "(WEi)" and insert -- $(WE_i)$ --, therefor throughout the claims.

In Column 7, Line 42, in Claim 6, delete "(WAi)" and insert -- $(WA_i)$ --, therefor throughout the claims.

In Column 8, Line 32, in Claim 11, delete "east" and insert -- least --, therefor.

Signed and Sealed this

Twenty-fourth Day of March, 2009

JOHN DOLL
*Acting Director of the United States Patent and Trademark Office*